(12) United States Patent
Hsiao et al.

(10) Patent No.: US 12,305,677 B2
(45) Date of Patent: May 20, 2025

(54) METHOD FOR COMBINING HETEROGENEOUS METAL PARTS

(71) Applicant: GIANT GLORY INTERNATIONAL LIMITED, Apia (WS)

(72) Inventors: Cheng-ping Hsiao, Pingtung County (TW); Hsiang-Jui Wang, Taoyuan (TW)

(73) Assignee: GIANT GLORY INTERNATIONAL LIMITED, Apia (WS)

( * ) Notice: Subject to any disclaimer, the term of this patent is extended or adjusted under 35 U.S.C. 154(b) by 0 days.

(21) Appl. No.: 18/408,684

(22) Filed: Jan. 10, 2024

(65) Prior Publication Data

US 2025/0052267 A1 Feb. 13, 2025

(30) Foreign Application Priority Data

Aug. 7, 2023 (TW) ................................. 112129519

(51) Int. Cl.
F16B 11/00 (2006.01)

(52) U.S. Cl.
CPC .................................. F16B 11/006 (2013.01)

(58) Field of Classification Search
CPC ............. F16B 11/006; B29C 2043/185; B29C 2043/189; B29C 65/70
See application file for complete search history.

(56) References Cited

U.S. PATENT DOCUMENTS

| | | | | |
|---|---|---|---|---|
| 4,350,654 A | * | 9/1982 | Yoshida | B29C 70/68 264/261 |
| 6,174,406 B1 | * | 1/2001 | Gaynes | F16B 11/006 156/295 |
| 7,491,437 B1 | * | 2/2009 | Corradino | B44C 1/26 428/913.3 |
| 2007/0031646 A1 | * | 2/2007 | Yamazaki | B29C 45/14811 264/261 |
| 2015/0258764 A1 | * | 9/2015 | Sa mannshausen | B32B 37/18 156/77 |
| 2016/0221254 A1 | * | 8/2016 | Saito | B29C 65/8215 |
| 2021/0362380 A1 | * | 11/2021 | Liu | B29C 66/02245 |

* cited by examiner

Primary Examiner — Sarang Afzali
Assistant Examiner — Darrell C Ford
(74) Attorney, Agent, or Firm — Thomas|Horstemeyer, LLP

(57) ABSTRACT

A method for combining heterogeneous metal parts includes steps of: a) disposing a first metal part in a mold cavity of a lower mold, the first metal part including a bottom portion, a vertical portion, and an extension portion; b) disposing a first upper mold on the upper surface of the extension portion of the first metal part; c) before or after step a), providing a bonding adhesive on the bottom portion of the first metal part; and d) after steps a), b), and c), pressing a second metal part downwardly to force a lower surface of second metal part to press against the bonding adhesive.

7 Claims, 5 Drawing Sheets

METHOD FOR COMBINING HETEROGENEOUS METAL PARTS

CROSS-REFERENCE TO RELATED APPLICATION

This application claims priority to Taiwanese Invention Patent Application No. 112129519, filed on Aug. 7, 2023, the entire disclosure of which is incorporated by reference herein.

FIELD

The disclosure relates to a combining method, and more particularly to a method for combining heterogeneous metal parts.

BACKGROUND

With the progress of the technology industry, the demand for consumer electronics, such as computers and peripherals thereof, is becoming increasingly greater. The design of the appearance of these consumer electronics is becoming important as consumers are paying greater attention to it. As a result, the aesthetics of the shells of these consumer electronics (e.g., cell phones, laptops, and tablets) have received much attention. Among the existing types of these shells of the consumer electronics, the most common ones may each be constituted of multiple parts with different materials such as a metal-plastic combined shell or a shell constituted of heterogeneous metal parts. Given that metal parts are capable of reflecting light, thereby may visually attract the consumers' attention, metal parts are highly valued. However, the lack of integration of heterogeneous metal parts still poses as a challenge to the technology industry.

Referring to FIGS. 1 and 2, CN106544674A discloses a surface treatment process for combining a magnesium casting piece 11 and an aluminum frame 12, which includes step S1, step S2, step S3, step S4, step S5, and step S6.

Step S1 involves polishing and sandblasting a bonding surface 111 of the magnesium casting piece 11 and a bonding surface 121 of the aluminum frame 12, so as to provide a good bonding surface for subsequent connection and thermal spraying. Step S2 involves coating a glue 13 on the bonding surface 111 of the magnesium casting piece 11, Step S3 involves connecting the bonding surface 121 of the aluminum frame 12 to the bonding surface 111 of the magnesium casting piece 11 through the glue 13 so as to form a workpiece assembly. Step S4 involves thermal spraying a nickel-aluminum material 14 in a gap between the magnesium casting piece 11 and the aluminum frame 12. Step S5 involves partially polishing the nickel-aluminum material 14 so as to make the workpiece assembly integrally formed and looking more natural as one piece. Step S6 involves paint spraying a surface of the entire workpiece assembly.

Although CN106544674A is capable of resolving the lack of integration between heterogeneous metal parts, CN106544674A is still unable to completely combine the magnesium casting piece 11 and the aluminum frame 12 in a single step (i.e., step S3), and needs to thermal spray the nickel-aluminum material 14 (i.e., in step S4) in the gap between the magnesium casting piece 11 and the aluminum frame 12 so as to completely combine the magnesium casting piece 11 and the aluminum frame 12. Therefore, CN106544674A involves an additional step in combining the magnesium casting piece 11 and the aluminum frame 12.

Improving and simplifying the process of combining heterogeneous metal parts is thus the issue at hand.

SUMMARY

Therefore, an object of the disclosure is to provide a method for combining heterogeneous metal parts that can alleviate at least one of the drawbacks of the prior art.

According to the disclosure, the method includes steps of:
a) disposing a first metal part in a mold cavity of a lower mold, the first metal part including a bottom portion that is located in the mold cavity and a vertical portion that extends upwardly from one end of the bottom portion and that cooperatively defines a recess area with the bottom portion, the first metal part further including an extension portion that extends laterally from a top end of the vertical portion over a top surface of the lower mold, a level of an upper surface of the extension portion of the first metal part being higher than a level of the top surface of the lower mold;
b) disposing a first upper mold on the upper surface of the extension portion of the first metal part, so as to expose the bottom portion and the vertical portion of the first metal part from the first upper mold;
c) before or after step a), providing a bonding adhesive on the bottom portion of the first metal part, the bonding adhesive having a viscosity sufficient to allow a top portion of the bonding adhesive to be higher than the top surface of the lower mold; and
d) after steps a), b), and c), pressing a second metal part downwardly to force a lower surface of second metal part to press against the bonding adhesive, the second metal part being made of a material that is different from a material of the first metal part, wherein the second metal part partially exposes the bottom portion of the first metal part and forms a gap with the vertical portion of the first metal part, and wherein a second upper mold is disposed on an upper surface of the second metal part opposite to the lower surface of the second metal part and a lower surface of the second upper mold covers the gap so as to allow the bonding adhesive to spread laterally in the recess area of the first metal part when being pressed, and so as to allow the bonding adhesive to upwardly fill the gap and to reach the lower surface of the second upper mold when the lower surface of the second upper mold is in contact with the top end of the vertical portion.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
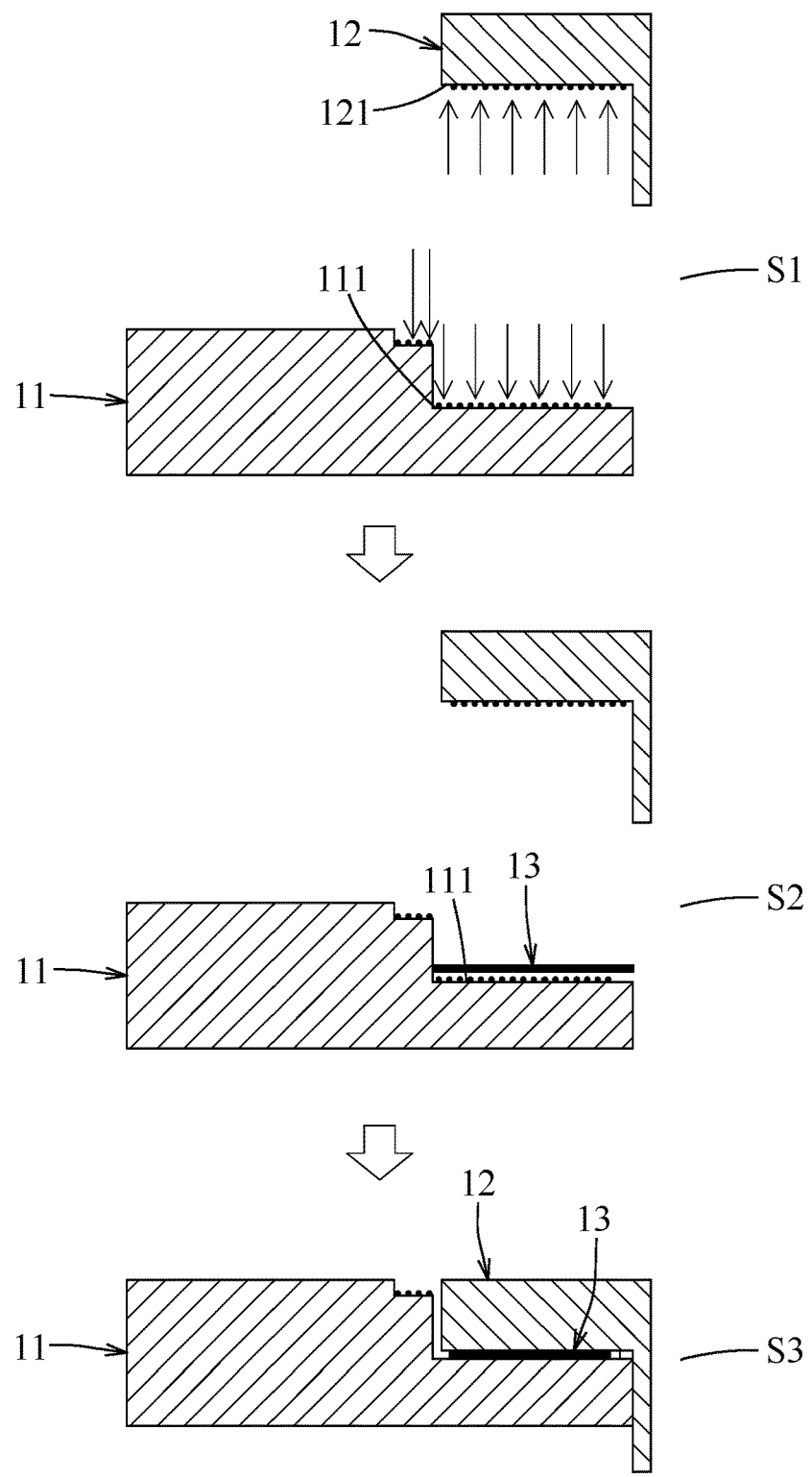
FIGS. 1 and 2 illustrate consecutive steps S1-S6 of a surface treatment process for combining a magnesium casting piece and an aluminum frame as disclosed in CN106544674A.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

According to an embodiment of the disclosure, a method for combining heterogeneous metal parts is adapted for manufacturing shells of laptops, tablets, cellphones, etc., and includes step a), step b), step c), and step d).

Figure 4:
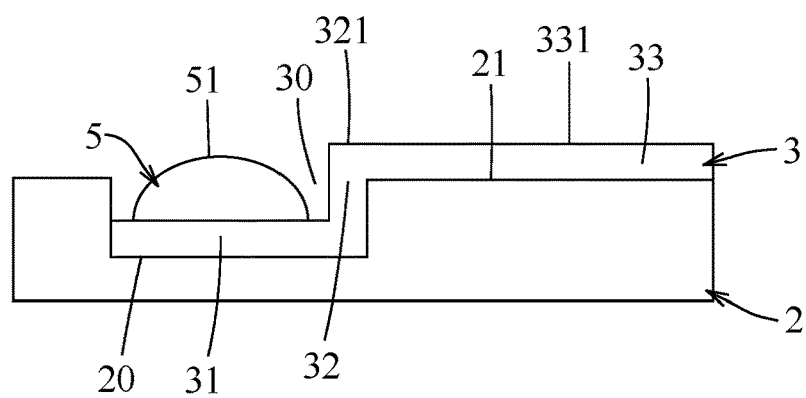
FIG. 4 is a schematic view illustrating step a) of the embodiment according to the disclosure.

Referring to FIG. 4, step a) involves disposing a first metal part 3 in a mold cavity 20 of a lower mold 2. The first metal part 3 includes a bottom portion 31 that is located in the mold cavity 20, and a vertical portion 32 that extends upwardly from one end of the bottom portion 31 and that cooperatively defines a recess area 30 with the bottom portion 31. The first metal part 3 further includes an extension portion 33 that extends laterally from a top end 321 of the vertical portion 32 over a top surface 21 of the lower mold 2, and a level of an upper surface 331 of the extension portion 33 of the first metal part 3 is higher than a level of the top surface 21 of the lower mold 2.

Figure 5:
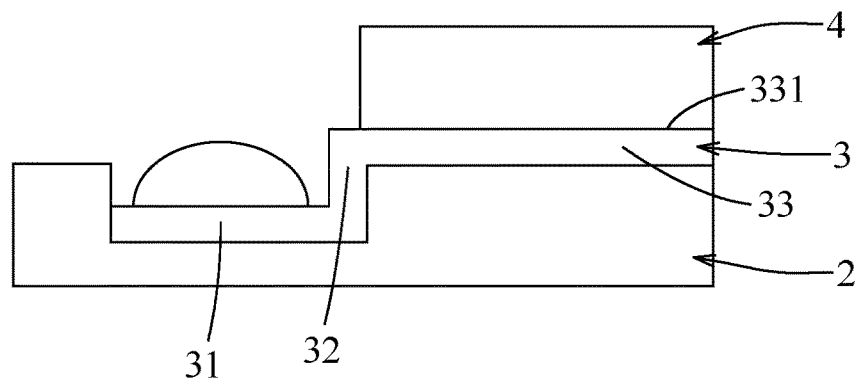
FIG. 5 is a schematic view illustrating step b) of the embodiment according to the disclosure.

Referring to FIG. 5, step b) involves disposing a first upper mold 4 on the upper surface 331 of the extension portion 33 of the first metal part 3, so as to expose the bottom portion 31 and the vertical portion 32 of the first metal part 3 from the first upper mold 4.

Figure 3:
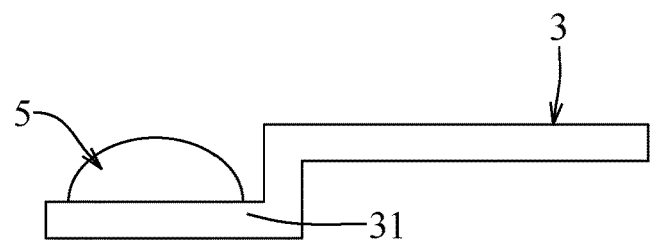
FIG. 3 is a schematic view illustrating step c) in a method for combining heterogeneous metal parts of an embodiment according to the disclosure.

Referring to FIG. 3, step c) involves providing a bonding adhesive 5 on the bottom portion 31 of the first metal part 3 before or after step a). The bonding adhesive 5 has a viscosity sufficient to allow a top portion 51 of the bonding adhesive 5 to be higher than the top surface 21 of the lower mold 2. In this embodiment, step c) is conducted before step a). Specifically, step c) involves disposing the first metal part 3 on a stage of an automatic glue dispenser (not shown) before being disposed on the lower mold 2. By virtue of a dispensing fixture (e.g., a dispensing jig) disposed on the stage of the automatic glue dispenser, the bottom portion 31 of the first metal part 3 is positioned. By virtue of a dispensing mechanism of the automatic glue dispenser, the bonding adhesive 5 is provided to the bottom portion 31 of the first metal part 3.

Figure 6:
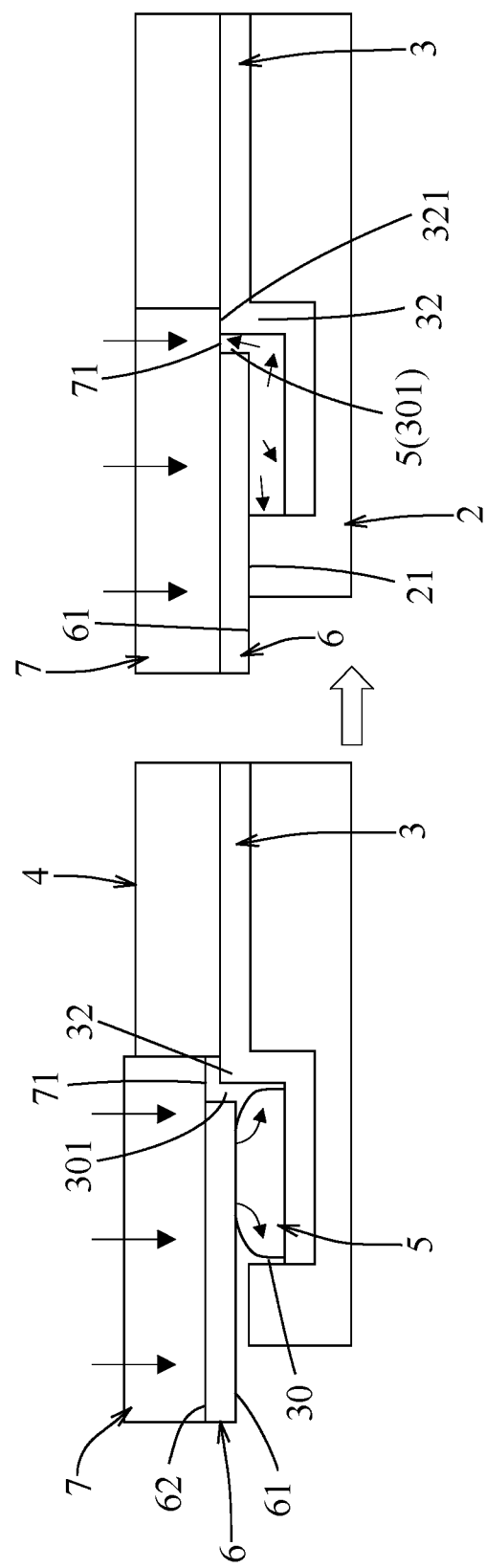
FIG. 6 is a schematic view illustrating step d) of the embodiment according to the disclosure.

Referring to FIG. 6, after steps a), b), and c), step d) involves pressing a second metal part 6 downwardly to force a lower surface 61 of second metal part 6 to press against the bonding adhesive 5. The second metal part 6 is made of a material that is different from a material of the first metal part 3. In this embodiment, the second metal part 6 partially exposes the bottom portion 31 of the first metal part 3 and forms a gap 301 with the vertical portion 32 of the first metal part 3. In addition, a second upper mold 7 is disposed on an upper surface 62 of the second metal part 6 opposite to the lower surface 61 of the second metal part 6. A lower surface 71 of the second upper mold 7 covers the gap 301 so as to allow the bonding adhesive 5 to spread laterally in the recess area 30 of the first metal part 3 when being pressed, and so as to allow the bonding adhesive 5 to upwardly fill the gap 301 and to reach the lower surface 71 of the second upper mold 7 when the lower surface 71 of the second upper mold 7 is brought into contact with the top end 321 of the vertical portion 32. It should be noted that, since the recess area 30 of the first metal part 3 is cooperatively defined by the bottom portion 31 and the vertical portion 32 of the first metal part 3, a volume of each of the recess area 30 and the gap 301 may be accurately calculated before step c). When conducting step c), an amount of the bonding adhesive 5 provided to the bottom portion 31 of the first metal part 3 is controlled by a parameter set by the automatic glue dispenser, thereby minimizing a possibility of overflowing glue during step d). In this embodiment, the first metal part 3 and the second metal part 6, which are made of different materials, are each made of a material selected from magnesium, aluminum, stainless steel, or titanium.

It should be further noted that, to make the top portion 51 of the bonding adhesive 5 higher than the top surface 21 of the lower mold 2 after conducting step c), so as to allow the bonding adhesive 5 to spread laterally in the recess area 30 of the first metal part 3 when being pressed, in some embodiments, in step c), the viscosity of the bonding adhesive 5 ranges from 15000 cps to 50000 cps. In this embodiment, the bonding adhesive 5 is a thermosetting epoxy resin.

In certain embodiments, the method for combining heterogeneous metal parts further includes step e) after step d), step f) after step e), step g) after step f), and step h) after step g).

Figure 7:
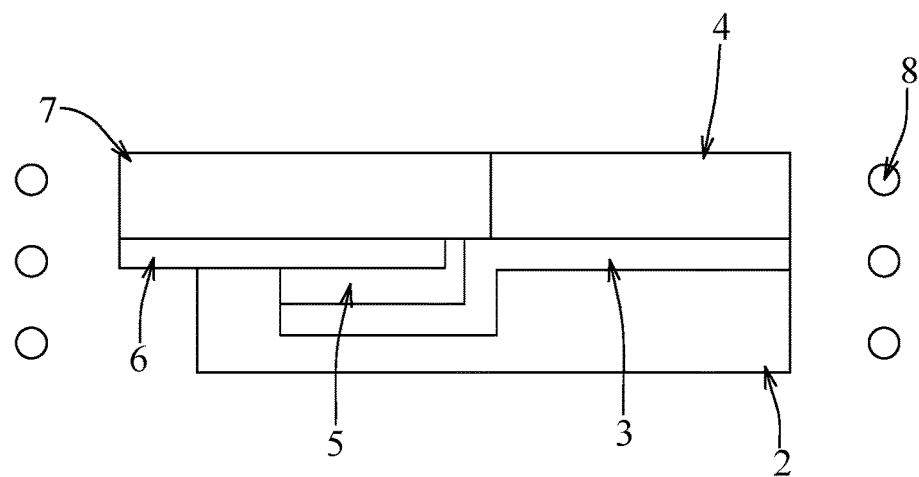
FIG. 7 is a schematic view illustrating step e) of the embodiment according to the disclosure.

Referring to FIG. 7, step e) involves curing the bonding adhesive 5 after step d) so as to combine the first metal part 3 and the second metal part 6. Specifically, step e) is conducted by heating the lower mold 2, the first metal part 3, the first upper mold 4, the bonding adhesive 5, the second metal part 6, and the second upper mold 7 in an oven 8 at a curing temperature ranging from 60° C. to 90° C. for a curing period of 60 seconds to 90 seconds.

Figure 8:
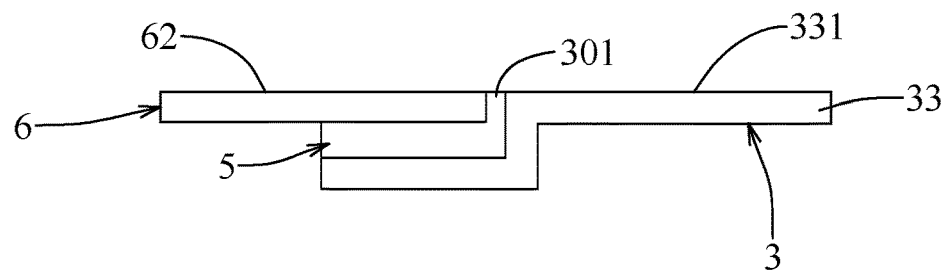
FIG. 8 is a schematic view illustrating step f) of the embodiment according to the disclosure.

Referring to FIG. 8, step f) involves first removing the first upper mold 4 and the second upper mold 7 as shown in FIG. 7, then removing the lower mold 2, so as to obtain the first metal part 3 and the second metal part 6 combined by the bonding adhesive 5.

Step g) may be conducted or not depending on a result of step d). Specifically, step g) is performed when there is an unevenness caused by an overflow of the bonding adhesive 5 at the gap 301 after step d). Step g) involves polishing the bonding adhesive 5 in the gap 301 and exposed from the upper surface 62 of the second metal part 6 and the upper surface 331 of the extension portion 33 of the first metal part 3.

Figure 9:
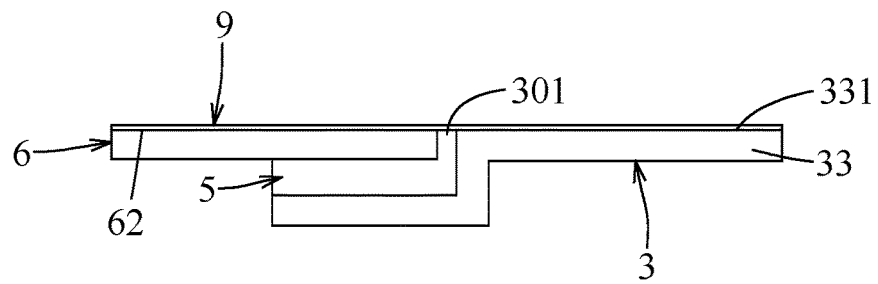
FIG. 9 is a schematic view illustrating step h) of the embodiment according to the disclosure.

Referring to FIG. 9, step h) involves spraying a paint layer 9 on the upper surface 62 of the second metal part 6, the upper surface 331 of the extension portion 33 of the first metal part 3, and the bonding adhesive 5 in the gap 301.

Figure 2:
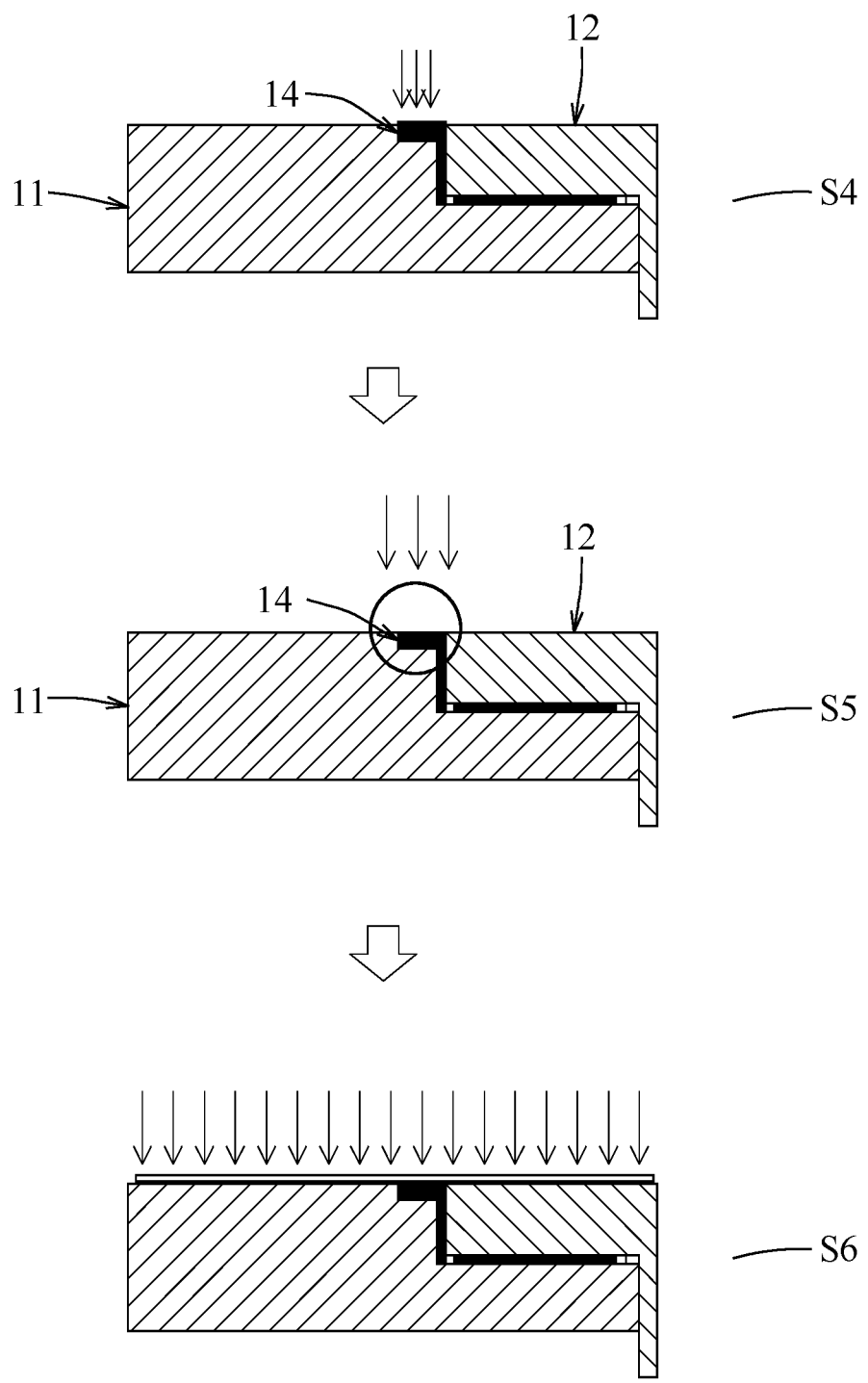

As can be seen from the above detailed description of the embodiment of the disclosure, in step d), the bonding adhesive 5 spreads laterally in the recess area 30 of the first metal part 3 when being pressed, and the bonding adhesive 5 upwardly fills the gap 301 due to the recess area 30 being reduced, thereby completely combining the first metal part 3 and the second metal part 6 and filling the gap 301 between the first metal part 3 and the second metal part 6. In simple terms, the first metal part 3 and the second metal part 6 may be combined and the gap 301 between the first metal part 3 and the second metal part 6 may be filled in a single step. On the contrary, in CN106544674A, when combining a magnesium casting piece 11 and an aluminum frame 12, step S3 (see FIG. 1) needs to be carried out first (i.e., using a glue 13 to combine a bonding surface 111 of the magnesium casting piece 11 and a bonding surface 121 of the aluminum frame 12), followed by step S4 (see FIG. 2) (i.e., forming a nickel-aluminum material 14 in a gap between the magnesium casting piece 11 and the aluminum frame 12 by thermal spraying), to thereby completely combine the magnesium casting piece 11 and the aluminum frame 12, so the process is more tedious.

In summary, the method for combining heterogeneous metal parts according to the disclosure may combine the first metal part 3 and the second metal part 6 and fill the gap 301 between the first metal part 3 and the second metal part 6 in one step (i.e., step d)), thereby simplifying the manufacturing process, and the purpose of this disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for combining heterogeneous metal parts, comprising steps of:

a) disposing a first metal part in a mold cavity of a lower mold, the first metal part including a bottom portion that is located in the mold cavity and a vertical portion that extends upwardly from one end of the bottom portion and that cooperatively defines a recess area with the bottom portion, the first metal part further including an extension portion that extends laterally from a top end of the vertical portion over a top surface of the lower mold, a level of an upper surface of the extension portion of the first metal part being higher than a level of the top surface of the lower mold;

b) disposing a first upper mold on the upper surface of the extension portion of the first metal part, so as to expose the bottom portion and the vertical portion of the first metal part from the first upper mold;

c) after step a), providing a bonding adhesive on the bottom portion of the first metal part, the bonding adhesive having a top portion to be higher than the top surface of the lower mold; and d) after steps a), b), and c), pressing a second metal part downwardly to force a lower surface of second metal part to press against the bonding adhesive, the second metal part being made of a material that is different from a material of the first metal part, wherein the second metal part partially exposes the bottom portion of the first metal part and forms a gap with the vertical portion of the first metal part, and wherein a second upper mold is disposed on an upper surface of the second metal part opposite to the lower surface of the second metal part and a lower surface of the second upper mold covers the gap so as to allow the bonding adhesive to spread laterally in the recess area of the first metal part when being pressed, and so as to allow the bonding adhesive to upwardly fill the gap and to reach the lower surface of the second upper mold when the lower surface of the second upper mold is brought into contact with the top end of the vertical portion.

2. The method as claimed in claim 1, wherein in step c), the viscosity of the bonding adhesive ranges from 15000 cps to 50000 cps.

3. The method as claimed in claim 1, wherein in step c), the bonding adhesive is a thermosetting epoxy resin.

4. The method as claimed in claim 1, further comprising step e) after step d), wherein step e) involves curing the bonding adhesive after step d) so as to combine the first metal part and the second metal part.

5. The method as claimed in claim 4, further comprising step f) after step e), wherein step f) involves removing the lower mold, the first upper mold, and the second upper mold.

6. The method as claimed in claim 5, further comprising step g) after step f), wherein step g) involves polishing the bonding adhesive in the gap and exposed from the upper surface of the second metal part and the upper surface of the extension portion of the first metal part.

7. The method as claimed in claim 6, further comprising step h) after step g), wherein step h) involves spraying a paint layer on the upper surface of the second metal part, the upper surface of the extension portion of the first metal part, and the bonding adhesive in the gap.

\* \* \* \* \*